United States Patent [19]

Manchak Jr. et al.

[11] Patent Number: 4,839,061
[45] Date of Patent: Jun. 13, 1989

[54] METHOD AND APPARATUS FOR TREATMENT OF HAZARDOUS MATERIAL SPILLS

[76] Inventors: Frank Manchak Jr.; Frank Manchak III, both of 330 Golden Shore Dr., Ste. 280, Long Beach, Calif. 90802

[21] Appl. No.: 206,192

[22] Filed: Jun. 13, 1988

[51] Int. Cl.$^4$ ............................................. B01D 57/00
[52] U.S. Cl. ................... 210/743; 210/170; 210/747; 210/241; 405/128; 405/129; 405/264; 37/71
[58] Field of Search ............... 210/170, 105, 205, 241, 210/242.2, 242.3, 739, 749, 751, 805, 901, 908, 924, 925, 743, 153, 747; 405/128–131, 264, 303; 37/64, 65, 71, DIG. 7; 358/108; 241/24, DIG. 38

[56] References Cited

U.S. PATENT DOCUMENTS

| | | | |
|---|---|---|---|
| 4,194,978 | 3/1980 | Crema | 210/242.3 |
| 4,606,774 | 8/1986 | Morris | 210/805 |
| 4,611,950 | 9/1986 | Russomano | 210/170 |
| 4,614,475 | 9/1986 | Tamura et al. | 37/DIG. 7 |
| 4,631,530 | 12/1986 | Gasper | 210/739 |

FOREIGN PATENT DOCUMENTS 0156546  5/1985  Japan ............... 37/DIG. 7

OTHER PUBLICATIONS

International Publication WO86/01439, Manchak, In Situ Waste Impoundment Treating Apparatus and Method of Using Same, Mar. 13, 1986.
International Publication WO88/02420, Boom for a Vehicle, Brocklebank et al., Apr. 7, 1988.

Primary Examiner—Frank Spear
Assistant Examiner—Joseph Drodge
Attorney, Agent, or Firm—Roth & Goldman

[57] ABSTRACT

Spills of hazardous materials are treated at the site of the spill using an integrated spill responder system which enables personnel to remain at a safe distance from the spill. The mobile, fully self-contained system is dispatched to the spill site and uses a remotely controlled spill treatment head which is maintained in close noncontact proximity to the spill. The system continuously monitors the progress of the treatment operation through various sensors mounted on a boom assembly, or by vacuum drawing samples of the spilled material and chemical treatment agents mixed therewith aboard the spill responder vehicle. Once the spill has been reduced to a non-hazardous form, the treated material can be left at the site of the spill, removed by standard vacuum trucks, or removed by the spill responder system itself by using internal storage tanks.

17 Claims, 3 Drawing Sheets

METHOD AND APPARATUS FOR TREATMENT OF HAZARDOUS MATERIAL SPILLS

BACKGROUND OF THE INVENTION AND PRIOR ART

This invention relates generally to the handling and disposal of hazardous materials, and more particularly to the treatment and cleaning-up of hazardous material spills.

Hundreds of millions of tons of hazardous materials are moved throughout the United States of highways and railroads. The consequences are severe whenever an accident of any kind causes a spill of these materials. In recent years, increased production, and resulting transportation, of these hazardous materials have increased the number of accidental spills. Accidental spills have become a growing problem for every industry in terms of staggering clean-up costs, and the long and short term costs to the environment and to humans.

Hazardous materials have been classified by the Environmental Protection Agency on the basis of ignitability, corrosivity, reactivity, and toxicity. Federal and local regulatory agencies require safeguards to be used in the handling of materials classified as hazardous.

Unlike a spill at a fixed site, such as a manufacturing facility, where the constant presence of hazardous materials and the potential for an accident are everyday facts of life, a transportation spill can occur almost anywhere at any time. Known techniques for the cleanup of transportation spills of hazardous material generally have involved either the flushing away of the material, which can cause considerable environmental damage, or in the isolation of the material by the use of an absorbent or similar material. The actual removal is commonly done by manual techniques using brushes, scoops, shovels and the like. These techniques are very inefficient and require large amounts of properly trained personnel, which skilled labor is not always readily available. A primary drawback of using absorbent materials, and the like, is that these materials add considerably to the quantity of material to be subsequently disposed of in a manner required by regulatory agencies. This increase in quantity substantially adds to the cost of disposal. Another problem encountered with the use of absorbent materials is that the absorption process is reversible, which does not comply with recent changes in regulations governing hazardous waste disposal.

U.S. Pat. No. 4,194,978, issued Mar. 25, 1980, to E. Crema, discloses a method and apparatus for removing solid and/or liquid matter containing harmful substances from the ground or other surfaces. In this arrangement, water is circulated onto the hazardous material for diluting same and is then drawn up by a vacuum arrangement into a holding tank on an associated vehicle. The recovered hazardous material is separated from the circulating water. This technique is very limited in applicability, since each hazardous material must be treated in a precise manner to comply with applicable regulations, and to assure the most efficient disposal of the waste.

SUMMARY OF THE INVENTION

It is an object of the present invention to provide a technique for on-site identification and treatment of hazardous materials involved in a transportation spill, and the like.

It is another object of the present invention to provide an efficient technique permitting the treatment, removal and disposal of spilled hazardous materials.

Still another object of the present invention is to provide mobile equipment for permitting the on-site identification, treatment and removal of spilled hazardous materials more safely and efficiently than known techniques for this purpose.

These and other objects are achieved according to the present invention by testing the material to be treated at the site of the spill, and measuring preselected chemical and physical properties of the material for the purpose of classification. Once properties have been measured and a suitable classification made, a response procedure for treating the material at the spill site is selected as a function of the properties that were measured so as to permit efficient treatment and, if necessary, removal of the spilled hazardous material.

The selected response procedure for treating the spilled hazardous material may require application of suitable treatment agents prior to, simultaneously with, or subsequent to removal of the spilled hazardous material from the spill site. Suitable treating reagents as well as steam, hot air, activated carbon and the like are transported to the spill site as part of the mobile apparatus for selective application as needed.

Should the selected response procedure include removal of the spilled hazardous material from the spill site, such removal is accomplished by drawing the material up through a suitable vacuum pump and depositing it into a holding tank, or other suitable storage container located on, or adjacent to the present invention.

Another advantage of the present invention is that it can be sent in response to hazardous material spills at remote locations, without needing large numbers of personnel for its operation.

This versatility allows the present invention to treat spilled hazardous materials in the most efficient and safest manner as selected for a particular spill, and in compliance with applicable laws and regulations.

DESCRIPTION OF THE PREFERRED EMBODIMENT

Referring now more particularly to FIGS. 1 through 4 of the drawings, a spill treatment apparatus 10, also referred to herein as a spill responder system, permits treatment of spilled hazardous materials m by use of a mobile vehicle 12 arrangeable adjacent a spill of hazardous material m. Vehicle 12 can be of any suitable construction and may be supported on wheels, tracks, skids or even on a barge or other floating vehicle since the apparatus is also considered useful for treatment of spills in a body of water.

Figure 1:
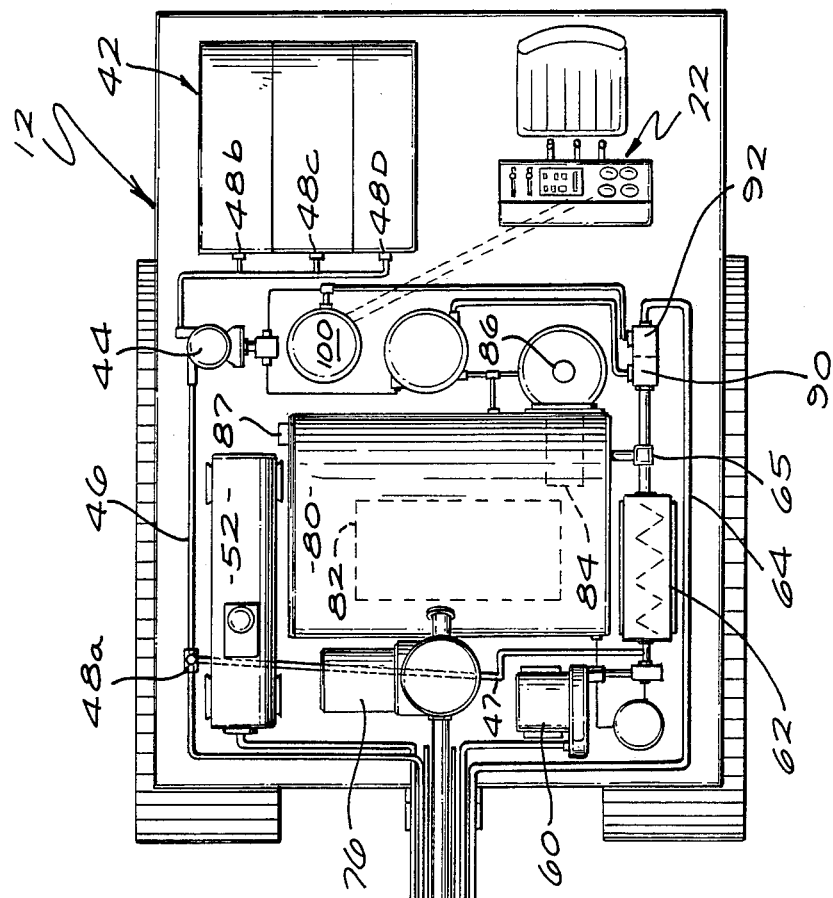
FIG. 1 is a diagrammatic, top view, showing apparatus for treating a hazardous material spill according to the present invention.
Figure 1:
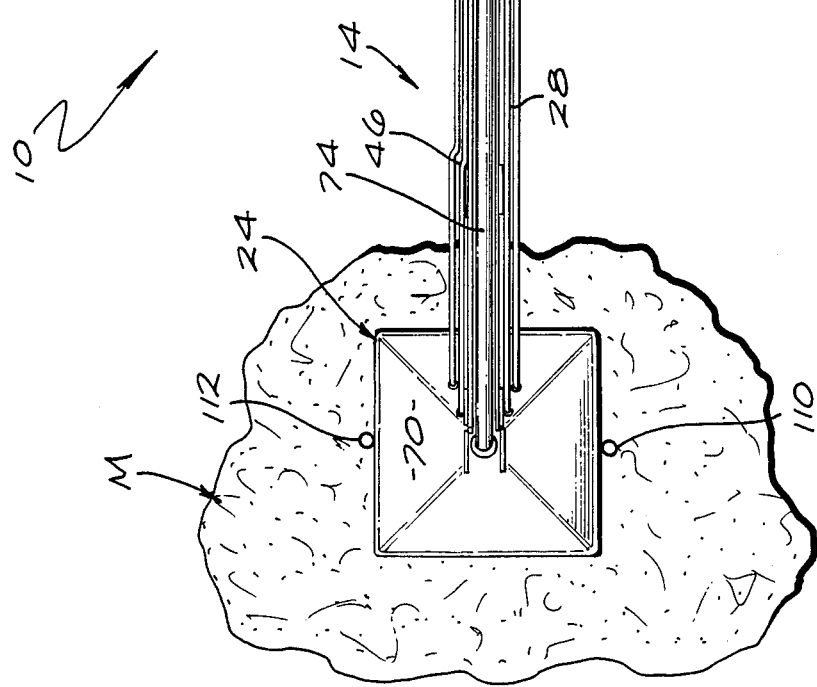
Figure 2:
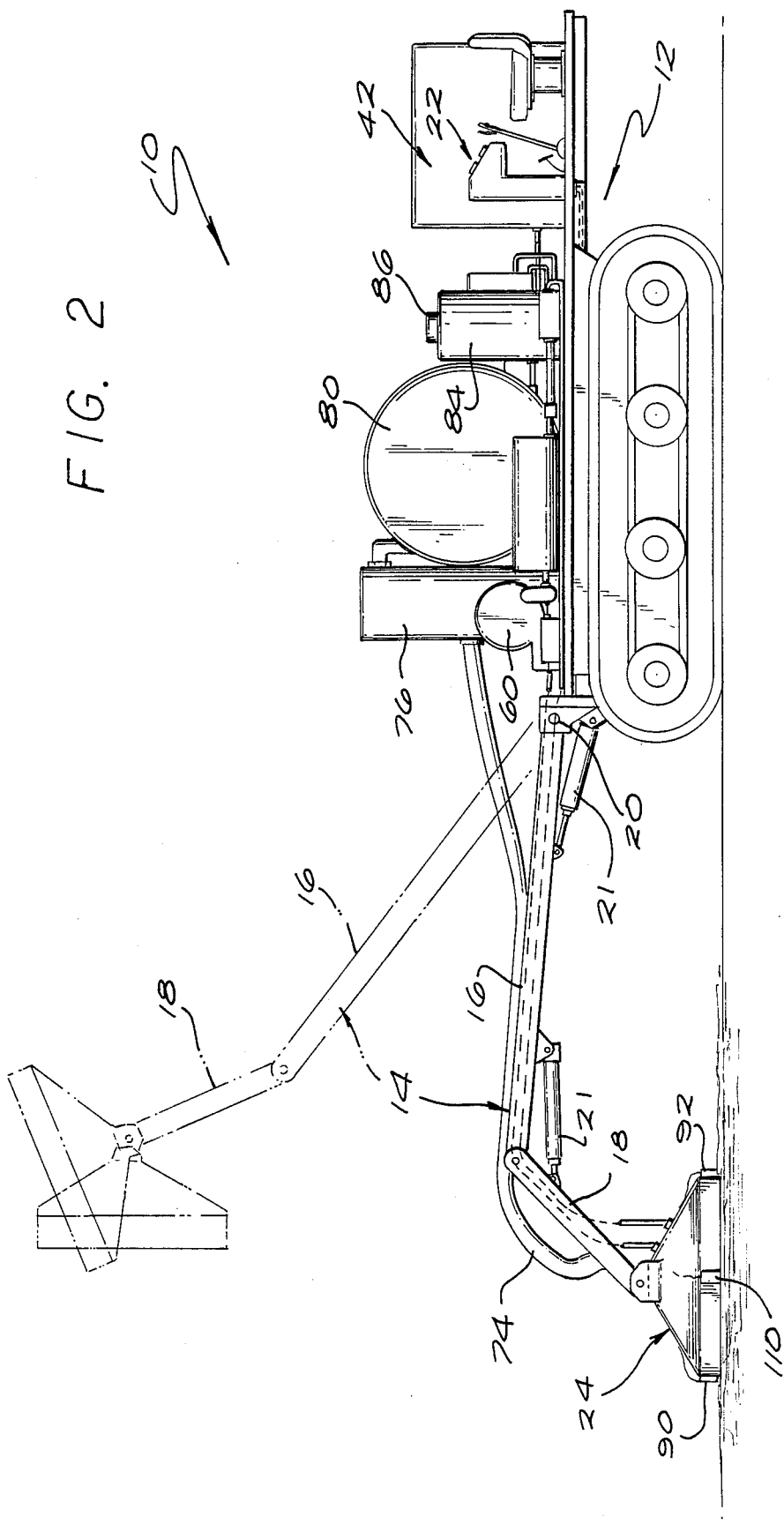
FIG. 2 is a diagrammatic, side-elevation view of the apparatus illustrated in FIG. 1.

The spill responder system 10 as shown in FIG. 2 comprises a mobile vehicle 12 provided with a hydraulically operable boom assembly 14 comprising a main boom 16, and an auxiliary boom 18 hingedly connected to main boom 16 in a suitable manner for pivotal movement with respect to boom 16. Main boom 16 is secured to apparatus 10 by a swivel joint 20 having a horizontal axis permitting approximately 90 degrees of vertical movement of boom 16 and approximately 180 degrees of movement about a vertical axis, not shown. Conventional hydraulic actuator units 21 are provided for horizontally and vertically manipulating the boom assembly 14 from a control center 22 aboard the vehicle 12. This arrangement permits the pickup head 24 to be used on vertical walls, sloping ground and the like.

Figure 3:
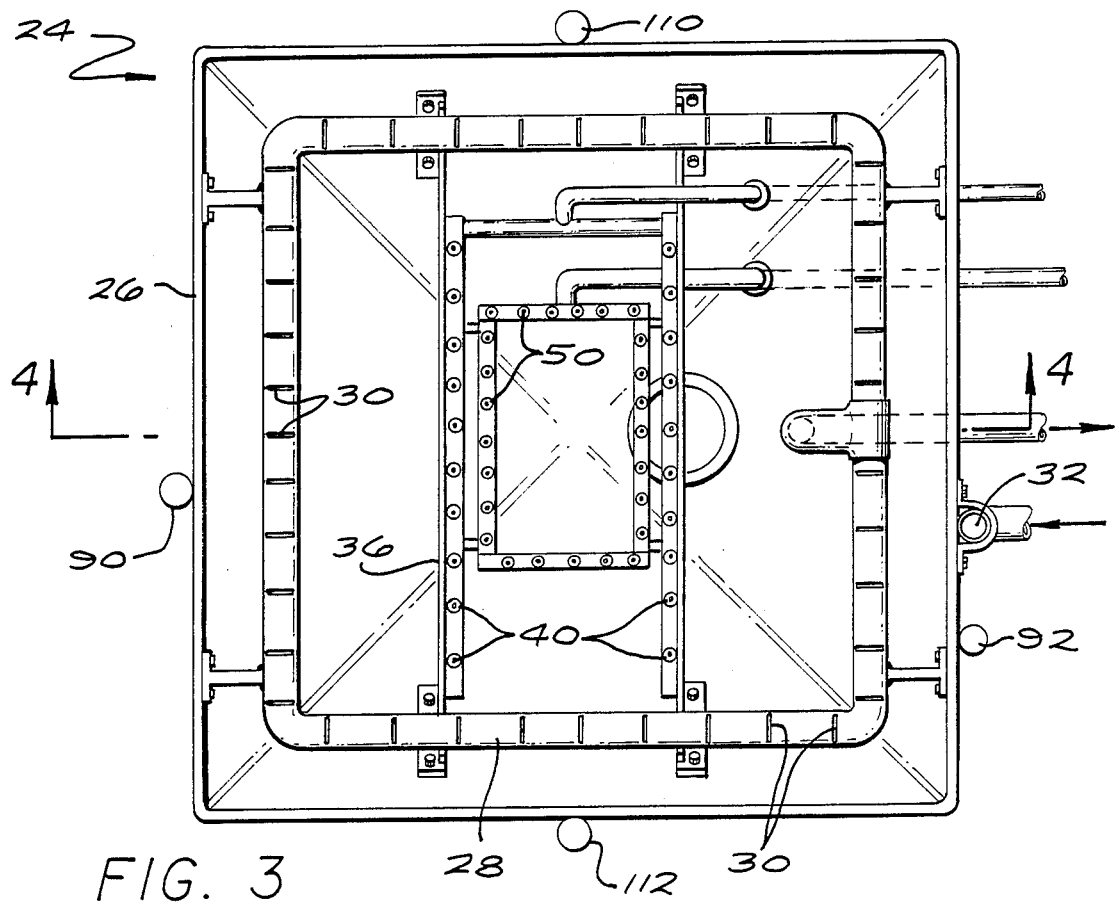
FIG. 3 is a diagrammatic, bottom plan view showing a pick-up head used with the apparatus illustrated in FIG. 1.
Figure 4:
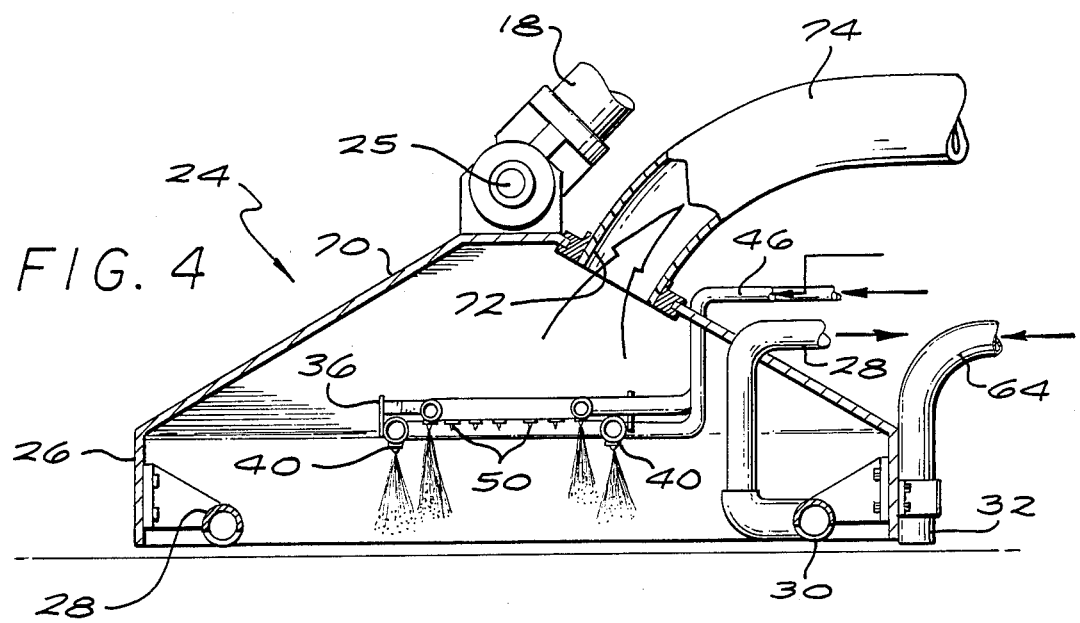
FIG. 4 is a diagrammatic, transverse sectional view taken generally along the line 4—4 of FIG. 3.

The pickup head 24 as shown in FIGS. 3 and 4 is mounted on the end of auxiliary boom 18 for pivotal movement in order to permit the position of the pickup head 24 to be adjusted relative to the associated vehicle 12 within the range of movement shown by the broken lines in FIG. 2. Pick-up head 24 is comprised of a rigid preferably rectangular frame 26. A peripherally extending suction conduit 28 having a plurality of spaced longitudinally extending openings 30 therein is mounted on the inner edges of frame 26 for picking up solid or liquid samples of the spilled hazardous material from near the edges of the pickup head 24. Also mounted on pickup head 24 at any convenient location preferably outside the boundaries of the frame 26 is a hazardous material discharge nozzle 32 for returning samples of tested hazardous materials to the spill site.

As seen in FIG. 3, pickup head 24 is also provided with cross braces 36 in the interior thereof for mounting a plurality of chemical treatment agent discharge nozzles 40 and steam or hot air nozzles 50 thereon. The particular arrangement of the discharge nozzles 40, 50 is not believed particularly important; however since steam, hot air and/or chemical reagents will be discharged into the waste spill at pressures high enough to provide substantial mixing, the discharge nozzles 40 and 50 should be spaced a sufficient distance interiorly from the edges of frame 26 so as to generally prevent turbulent conditions in the region of discharge inside of the pickup head 24 from extending outside the pickup head 24.

Suction conduit 28 extends from the pickup head 24 along the boom assembly 14 as shown to a sample collection vacuum pump 60 aboard vehicle 12.

Also shown is a pyramid shaped gas collection hood 70 affixed to pickup head 24 and having a discharge outlet 72 at its apex for the evacuation of gases collected in hood 70 via a conduit 74 which extends along the boom assembly 14 to a gas collection pump 76 aboard vehicle 12. Pickup head 24 is pivotally connected to auxiliary boom 18 at joint 25 and is pivoted with respect thereto by a conventional hydraulic actuator unit.

A holding tank 80 aboard vehicle 12 receives the discharge of gas collection vacuum pump 76 and preferably has mounted therein a chilling apparatus 82 for condensing the moisture content of gas discharged by pump 76 which collects in holding tank 80 and which will contain a substantial proportion of volatile hydrocarbons, if any, present in the gas. Also mounted in holding tank 80 is a gas filter 84, preferably a regenerable activated carbon filter, for filtering remaining harmful contents from the uncondensed gas collected from hood 70 which then may safely be discharged to atmosphere at vent 86.

Liquid or dry treatment reagents are preferably applied directly to the spill by nozzles 40 rather than being mixed with spilled hazardous material aboard vehicle 12 although it is contemplated that mixing could take place aboard the vehicle by conducting chemical reagents from on board sources 42 via a remotely controlled valved branch conduit 47 to the inlet side of a static mixer 62 arranged at the discharge side of sample collection vacuum pump 60. Chemical reagents are conducted from the sources 42 thereof to nozzles 40 by a reagent pump 44 and conduit 46. The pump pressure is selected to ensure that the discharge pressure at the nozzles 40 is adequate to ensure intimate mixing of the reagent with the spilled hazardous material. Remote controllable valves 48a–48d at the locations shown in the reagent conduit 46 enable automatic controls or a human operator to select which reagent to use dependent upon the character of the spilled hazardous material and the routing of reagent directly through conduit 46 to the spill or through branch conduit 47 to static mixer 62.

The static mixer 62 receives the discharge of sample collection vacuum pump 60 to homogenize the contents of conduit 28 before the sampled materials are returned to the spill site by sample return conduit 64 which is routed back along the boom assembly to the hazardous material discharge nozzle 32.

An important feature of the invention is its capability of immediately determining the characteristics of the spilled material in the field and of monitoring the progress of the treatment as heated fluids or chemical reagents are applied to the spill. At the minimum, the apparatus is provided with pH and oxidation reduction potential (ORP) probes 90, 92 at suitable locations in conduit 64 at the output of static mixer 62 and preferably also on the pickup head 24 so that the sampled materials conducted aboard the apparatus in conduit 28 may be accurately determined.

A central controller unit 100 is located in the control central 22 aboard vehicle 12. The controller unit 100 comprises pH and oxidation reduction potential (ORP) analyzers and a flame ionization detector (FID) for continuously monitoring data electronically transmitted from the probes 90, 92. Central controller unit 100 therefore provides analytical data which may be displayed in control center 22 to enable a human operator to actuate selected remote controllable valves 48 as desired or this process can be completely automated by the use of computer techniques.

If the probes 90, 92 and central controller unit 100 detect the presence of volatile hydrocarbons in the spill, heat in the form of steam or hot air produced from an on board boiler 52 is discharged from the steam nozzles 50 on the pickup head 24 directly onto the spilled materials. The above mentioned vacuum pump 76 is then actuated to remove hydrocarbons volatilized by the injection of steam underneath the pickup head 24 and hood 70.

It will be appreciated by those skilled in the art that additional probes 90, 92 may be mounted on pickup head 22, in holding tank 80 near vent 86 and in other locations as desired to permit more accurate sensing and identification of the preselected physical and chemical characteristics such as pH, oxidation reduction potential (ORP) and temperature of hazardous material m in a known manner. One example of analyzing equipment suitable for use with system 10 as a gas analyzer is a conventional flame ionization detector can be employed as a hydrocarbon analyzer, one suitable example being Model No. RS 100 manufactured by Ratfisch Instruments of Garden Grove, Ca.

Preferably, the pickup head 24 should be maintained at a substantially constant distance from the spill. Accordingly, a proximity sensor or sensors 110 may be mounted in the vicinity of the pickup head 24 with automatic warning signals being transmitted to the control center 22 if the operator inadvertently allows the pickup head 24 to deviate from preselected distance limits.

For safety purposes at least one thermocouple 112 is provided on the pickup head 24 in order to measure, in a conventional manner, the temperature of hazardous material m particularly while same is being treated. Various reagents used in treating certain hazardous materials can cause exothermic reactions, and as a result it is important that the temperature of these hazardous materials be monitored in order to make certain that, for example, the flash point of the materials is not reached. The out put of the thermocouple 112 is transmitted to the control center 22 for display on a control panel.

Finally, it will be appreciated by those skilled in the art that one or more auxiliary vehicles (not shown) or hand held vacuums (not shown) can be connected to mobile vehicle 12 and arranged for drawing hazardous material m aboard vehicle 12.

In operation, the spill responder system 10 according to the present invention treats spilled hazardous materials by first measuring as by the probes 90, 92 properties of hazardous material m, such as oxidation reduction potential, pH, temperature and the like. Based on the properties measured an appropriate procedure or plan is selected for treating the spilled hazardous material m.

If this procedure calls for applying a treating agent, or for volatizing hazardous material m, either prior to or simultaneously with removal of material m from the spill site, the appropriate reagent or heated medium is fed through the nozzles 40, 50 and onto the spill.

At any time during the treatment process particularly hazardous or difficult to treat material m may be drawn from the spill site and routed to holding tank 80 by remotely controllable valve 65 and associated branch conduit to tank 80. When holding tank 80 is full, the overflow can either by drawn off through discharge port 87 to an auxiliary holding tank, or mobile vehicle 12 can be taken to an appropriate disposal facility.

A wide variety of reagents are usable with a system 10 according to the present invention including neutralizers, dispersants, emulsifiers, oxidizers, absorption solidifiers, and the like. If the spilled hazardous material m is an acid or a caustic, for example, the pH is first brought into a range from 5 to 9 and the spill may be solidified as appropriate. Volatilized organics are separated from remaining air within the holding tank by the chilling apparatus 82 or the contents of gas conduit 74 may be conducted directly to filter 84. Other hazardous materials are neutralized, oxidized or solidified as appropriate.

Solidifiers must involve either chemical transformation or encapsulation in the nature of an irreversible process. If petroleum hydrocarbons, solvents, and other liquid synthetic chemicals, are involved, the CdF Chimie Company of Paris has developed an agent sold under the trade name "Norsorex Ap" which is effective in treating these materials. If the material m is an aromatic, amine, aldehyde, or a chlorinated solvent or ester, a solvent solidifier such as that sold under the trade name Spill-X by Ansul Corporation of Marionette, Wis. can chemically transform the liquid material into a pliable mass that exceeds current regulations.

Persons skilled in the art will readily appreciate that various modifications can be made from the preferred embodiment of the invention disclosed above thus the scope of protection is intended to be defined only by the limitations of the appended claims.

We claim:

1. A method of treating a spill of hazardous material comprising the steps of:
   (a) supporting a spill pickup and treatment head from a mobile apparatus and sensing the distance between said head and the spill surface;
   (b) automatically maintaining a substantially constant distance between said head and the spill surface to permit said head to efficiently draw a sample from the spill surface without said head directly contacting the spill surface;
   (c) vacuum drawing a sample of said hazardous material with said head from the site of the spill to said mobile treatment apparatus;
   (d) measuring preselected physical or chemical properties of said hazardous material sample on board said apparatus;
   (e) using said measured properties to select one or more treatment agents for treating the spilled hazardous material;
   (f) transferring said treatment agent or agents from supplies thereof aboard said mobile treatment apparatus to the spill of the hazardous material; and
   (g) repeatedly drawing samples of a mixture of the spilled hazardous material and treatment agent from the spill site aboard the mobile apparatus and evaluating, on board said mobile apparatus, effectiveness of said agent or agents in treatment of said spill.

2. The method of claim 1, wherein said treatment agent is discharged onto said spill at pressure sufficiently high so as to provide substantially complete mixing of said agent with the spilled hazardous material.

3. The method of claim 1, wherein said sample of the spilled hazardous material is vacuum drawn from the site to said mobile treatment apparatus, said treatment agent is mixed with the spilled material sample on board said mobile treatment apparatus, and said treated mixture is discharged from said treatment apparatus back to the spill site.

4. The method of claim 1, wherein said spilled hazardous material comprises volatile hydrocarbons and the step of repeatedly drawing samples includes the step of volatilizing said hydrocarbons by application of heat to the spill and vacuum drawing air and volatilized hydrocarbons from said spill to said mobile apparatus for testing.

5. The method of claim 4, further comprising the step of stripping said hydrocarbons from said on board said mobile apparatus.

6. The method of claim 1, further comprising the steps of remote controlling horizontal and vertical movement of said head from aboard said mobile apparatus.

7. The method of claim 6, further comprising the step of remote controlling from said mobile apparatus pivotal movement of said head with respect to a boom which is connected to and extends from said mobile apparatus to said head which is mounted on said boom.

8. The method of claim 1, wherein said preselected physical or chemical properties comprise pH and oxidation reduction potential (ORP).

9. The method of claim 8, wherein said spilled hazardous material comprises volatile hydrocarbons and further comprising the step of monitoring the temperature of the volatile hydrocarbons drawn from said spill.

10. The method of claim 1, further comprising the step of varying the rate of application of said treatment agent or agents in dependence upon the evaluated effectiveness of the treatment and terminating the application of treatment agent immediately upon reaching the desired level of effectiveness of treatment.

11. Apparatus for treating a spill of hazardous material comprising in combination:
    (a) a mobile apparatus;
    (b) said mobile apparatus having suction means thereon for drawing the material from said spill on board the mobile apparatus;
    (c) sensing means mounted on board the mobile apparatus for determining preselected properties of the material; and
    (d) applicator means mounted on the mobile apparatus for applying a selected treating agent or agents to the spill of hazardous materials; said suction means including a pickup head movably mounted on the mobile apparatus, manipulating means connected to the apparatus and to the pickup head for positioning the pickup head relative to the material to be removed, and a distance measuring means mounted on the pickup head for controlling spacing of the pickup head from the hazardous material to be removed.

12. The apparatus of claim 11, wherein the manipulating means includes a main boom, pivot means supporting the main boom on the mobile apparatus for permitting lateral movement of the main boom and an auxiliary boom hingedly connected to the main boom for pivotal movement with respect thereto.

13. The apparatus of claim 12, wherein the main boom is comprised of multiple telescoping sections.

14. The apparatus of claim 11, wherein the measuring means and the applicator means are mounted on the pickup head.

15. The apparatus of claim 11, wherein the applicator means includes at least one nozzle mounted on the pickup head, and treating agent dispensing means mounted on the mobile apparatus and connected to said nozzle for selectively supplying thereto a selected treating agent.

16. The apparatus of claim 11, wherein the suction means is comprised of a pump and further includes a holding tank mounted on the mobile apparatus and arranged for receiving material to be removed from the site.

17. The apparatus of claim 11, wherein the pickup head comprises a hood for collecting fumes from the site of the spill.

* * * * *